United States Patent [19]

Kumada

[11] Patent Number: 4,496,247
[45] Date of Patent: Jan. 29, 1985

[54] DISPLAY DEVICE WITH TRANSPARENT COVER AS A VIBRATOR OF A SOUND GENERATOR

[75] Inventor: Akio Kumada, Kokubunji, Japan

[73] Assignee: Hitachi, Ltd., Tokyo, Japan

[21] Appl. No.: 454,531

[22] Filed: Dec. 30, 1982

Related U.S. Application Data

[62] Division of Ser. No. 199,231, Oct. 21, 1980, abandoned.

[30] Foreign Application Priority Data

Oct. 22, 1979 [JP] Japan ................... 54-135170
Oct. 22, 1979 [JP] Japan ................... 54-135171
Oct. 24, 1979 [JP] Japan ................... 54-136402
Oct. 24, 1979 [JP] Japan ................... 54-136405

[51] Int. Cl.³ .................................. G04C 21/16
[52] U.S. Cl. .................................. 368/255; 310/363
[58] Field of Search ............... 368/253, 255; 310/322, 310/363, 364

[56] References Cited

U.S. PATENT DOCUMENTS 3,872,411 3/1975 Watanabe et al. ............ 310/369
4,130,771 12/1978 Bottom ........................ 310/363
4,259,607 3/1981 Noguchi et al. .............. 310/364

Primary Examiner—Bernard Roskoski
Attorney, Agent, or Firm—Antonelli, Terry & Wands

[57] ABSTRACT

Disclosed is a display device including a transparent piezoelectric element having transparent electrodes coated on both surfaces thereof, bonded by transparent adhesive material on an inner surface of a transparent cover to be arranged in front of a display panel of the display device. The transparent cover works as a vibration generator of a sound source. The thickness of the transparent electrodes are selected to serve as an anti-reflection layer of the near ultraviolet light. Relative dimensions of and positional relation between the transparent cover and the piezoelectric element are limited in predetermined ranges to assure high quality of display characteristic and sufficient volume of sound.

8 Claims, 15 Drawing Figures

DISPLAY DEVICE WITH TRANSPARENT COVER AS A VIBRATOR OF A SOUND GENERATOR

This is a division of application Ser. No. 199,231, filed Oct. 21, 1980, now abandoned.

BACKGROUND AND SUMMARY OF THE INVENTION

The present invention relates to a display device having a transparent cover, which serves as a sound source, made of a transparent body to be arranged in front of a display panel of the display device.

In a prior art wrist watch having an alarm function, a buzzer is mounted in a back rid on a back of a case so that sound is generated by vibrating the buzzer and propagated to the exterior through sound holes formed in the back rid. In such a type of wrist watch, however, if the sound holes in the back rid are eliminated the sound propagated to the exterior is attenuated, while a water proof structure is not attained because of the sound holes. In addition, because of the structure to protect the vibrating reed, the thickness of the watch increases.

In a recently proposed wrist watch as shown in FIG. 1, a transparent cover 5 to be mounted in front of a display panel 1 of a body 4 which contains the display panel 1, a drive source 2 and a watch driver 3 is directly vibrated so that the cover 5 functions as a sound generator. As shown in FIG. 2, in order to vibrate the cover 5, a piezoelectric vibrator 10 which is made of a transparent piezoelectric ceramic plate and has transparent electrodes 8 and 9 arranged on both surfaces thereof is bonded by transparent adhesive material 7 on an inner surface of the cover 5 having a transparent electrode 6 coated thereon. A voltage is applied to the transparent piezoelectric vibrator 10 through a contact 11 which contacts the transparent electrode 6 of the cover 5 and an electric contact 12 which contacts the exposed one 9 of the transparent electrodes of the transparent piezoelectric vibrator 10 so that the integrated cover 5 vibrates to generate sound. The cover 5 is coupled to a body 4 through a waterproof and anti-shock packing 13 which functions as a washer.

With respect to the piezoelectric element to be used in the wrist watch of such a structure which utilizes the transparent cover as the sound generator, there are various problems to be further resolved. They are:

1. Liquid crystal used as the display element looks poor in contrast ratio when it is viewed obliquely.
2. A high quality of display, sufficient volume of sound and ability to protect against a mechanical shock are not attained and the cost increases unless relative dimensions of and positional relation of the piezoelectric element and the transparent cover are properly defined.

It is an object of the present invention to provide a display device which overcomes the problems based on the piezoelectric vibration element.

According to one aspect of the present invention, there is provided a display device having a transparent cover serving as a vibrator of a sound generator, said transparent cover having a transparent piezoelectric element coated with transparent electrodes on both surfaces thereof, bonded to an inner surface of said transparent cover by transparent adhesive material, said transparent cover being arranged in front of a display panel of said display device, wherein said transparent electrodes are used as anti-reflection films for the light near ultraviolet ray.

According to the second aspect of the present invention, there is provided a display device having a transparent cover serving as a vibrator of a sound generator, said transparent cover having a transparent piezoelectric element coated with transparent electrodes on both surfaces thereof, bonded to an inner surface of said transparent cover with transparent adhesive material, said transparent cover being arranged in front of a display panel of said display device, wherein the length l and the thickness $t_1$ of said transparent cover and the thickness $t_2$ of said piezoelectric element are selected to meet the following relations:

$$5.6 \times 10^2 (t_1 + t_2) \leq l^2 \qquad (a)$$

$$2.5 \times 10^3 (t_1 + t_2)^3 \leq l^2 \qquad (b)$$

$$t_2 \geq 0.1 \text{ mm.} \qquad (c)$$

According to the third aspect of the present invention, there is provided a display device having a transparent cover serving as a vibrator of a sound generator, said transparent cover coated with a transparent piezoelectric element coated with transparent electrodes on both surfaces thereof, bonded to an inner surface of said transparent cover with transparent adhesive material, said transparent cover being arranged in front of a display panel of said display device, wherein an area of the transparent cover other than a specific view area is formed as a shielding area, said piezoelectric element extends to cover mid-points between the center and the periphery of said transparent cover, and the size of said piezoelectric element is determined to be over such a minimum size that the periphery thereof is not placed inside of said view area.

According to the fourth aspect of the present invention, there is provided a method for manufacturing a piezoelectric element body to be bonded to a transparent cover of a display device after slicing a cylindrical transparent piezoelectric ceramic boule into disks and polishing them, and then cutting away predetermined peripheral areas of the polished disks to form the desired shape wherein when a single piezoelectric element body is to be cut out from one of the said sliced disks, the ingot diameter is selected to be 0.7 to 0.9 times as large as the outer diameter $D_1$ of said transparent cover, and when double piezoelectric element bodies are to be cut out from one of said sliced disks, said ingot diameter is selected to be $1/0.7-1/0.9$ times as large as said outer diameter $D_1$, and said sliced bodies are cut such that the outer periphery of said ingot remains at least two corners of said piezoelectric element body.

Those and other objects and features of the present invention will be apparent from the following description taken in conjunction with the accompanying drawings.

DETAILED DESCRIPTION OF THE PREFERRED EMBODIMENT

The problems related to the piezoelectric element discussed above and the solutions therefor will now be specifically explained.

Aspect I

Figure 1:
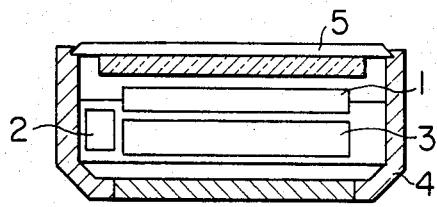
FIG. 1 shows a sectional view illustrating a general structure of a prior art wrist watch.
Figure 2:
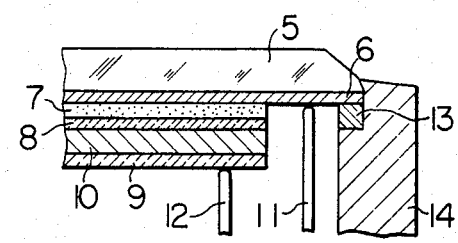
FIG. 2 shows a fragmental enlarged view thereof.

As discussed above, in the wrist watch of the structure shown in FIGS. 1 and 2, a liquid crystal is usually employed, which generally shows a poor contrast ratio when it is viewed obliquely.

Figure 3:
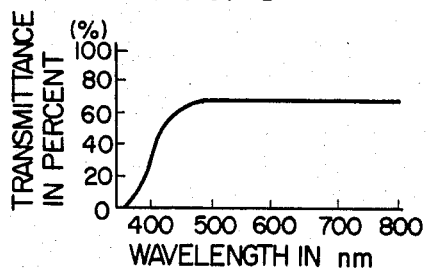
FIG. 3 is a graph showing a spectrum characteristic of a light transmittance through a transparent piezoelectric ceramic element.

In the display element which uses a transparent sound generating cover having a transparent piezoelectric vibrator bonded thereto, there is a tendency of decreasing contrast of display. FIG. 3 shows a spectrum characteristic of a light transmittance through the transparent piezoelectric element. As shown, the transmittance is as high as 70% as the center wavelength ($\lambda \approx 530$ nm) of a visible light. The remaining 30% of light is not absorbed but reflected from the surfaces. This is a theoretical value of the surface reflection when the absorption is negligible, considering the fact that the refraction index of the piezoelectric element is 2.5.

Figure 4:
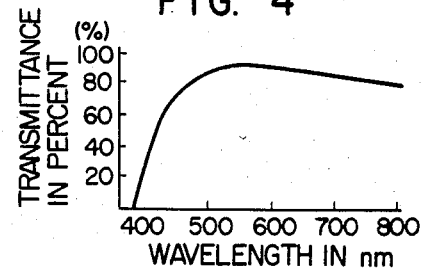
FIG. 4 is a graph showing a spectrum characteristic of a light transmittance through a transparent piezoelectric ceramic element covered with transparent electrodes ($In_2O_3$—$SnO_2$ films) having a thickness of 132 nm.

On the other hand, an $In_2O_3$—$SnO_2$ film is used as the transparent electrode to the piezoelectric element. Since the $In_2O_3$—$SnO_2$ film has a refraction index of 1.5–1.8, it has been found that it is also useful as an anti-reflection film. It has been commonly known that the thickness of the anti-reflection film for visible light rays is preferably one quarter of the center wavelength ($\lambda \approx 530$ nm) of the visible light. In the past, no attention has been paid to the thickness of the $In_2O_3$—$SnO_2$ electrode film except with respect to its electric characteristic. When it is selected to have a thickness of 132 nm, the light transmittance of the piezoelectric element at the center wavelength ($\lambda \approx 530$ nm) of the visible light is increased up to 87% or more as shown in FIG. 4 and the characters on the liquid crystal display element can be observed more brightly. It is thus understood that the display contrast ratio depends on the thickness of the transparent electrode film covered on the piezoelectric element.

However, despite the selection of such thickness of the transparent electrode film, the transparent cover still appears violet when it is observed obliquely and the characters become hard to be viewed.

From the investigation on this point, it has been found that this is because the short wavelength light is reflected at the surface of the transparent piezoelectric element in proportion to the decreased part in transmittance at short wavelength (ultraviolet ray).

The inventor of the present invention has found that by making the thickness of the transparent electrode with the thickness as serves as the anti-reflection film for the short wavelength light, the display contrast ratio for the oblique viewing is improved, and the display appears more colorless and bright when viewed perpendicularly.

Figure 5:
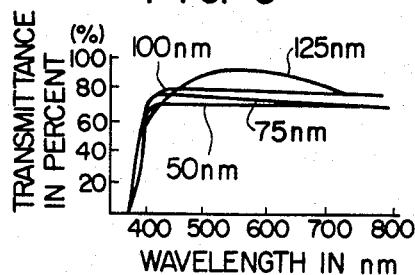
FIG. 5 is a graph showing a spectrum characteristic of a light transmittance through a transparent piezoelectric element covered with transparent electrodes in accordance with a first aspect of the present invention.

In one embodiment of the present aspect, the thickness of the transparent electrodes of the piezoelectric element is set to one quarter of the wavelength ($\lambda = 300$–500 nm) of the near ultraviolet light, that is, to 75–125 nm. As a result, as seen from a graph shown in FIG. 5, the $In_2O_3$—$SnO_2$ film of the thickness of 75–125 nm has a transmittance of approximately 70% in the short wavelength region (the transmittance being improved by 23% at most to compare with a non-electrode plate) and the display does not appear violet when viewed obliquely. The transmittance decreases at 530 nm in wavelength at which the sensitivity of human eye becomes highest, but it is not less than 70% in the worst case. Thus, a substantially constant spectrum characteristic is obtained over the entire visible range and the element appears colorless.

The present aspect is not limited to the specific embodiment explained above. The thickness of the transparent electrode may be as thin as 50 nm, in which case an electrical resistance is low enough for use as a buzzer electrode. Incidentally, the electrical resistance is on the order of several thousands ohms for the thickness of 50 nm. Since the resistance increases with the thickness the thinner electrode may create a problem in that the electrical resistance is too high to supply necessary voltage. A multi-layered anti-reflection film made of $CaF_2$ or $MgF_2$ may be formed on the thin transparent electrode. The anti-reflection film may be of single layer structure for a monochromatic light but it is preferably of multi-layered structure for the white light because optimum thickness differs from wavelength to wavelength. The multi-layered structure per se for the anti-reflection is well known. In this case, in order to improve the transmittance of the respective layers for the 400 nm–700 nm visible light, the thickness of the respective layers are set to one quarter of the respective wavelengths, for the light longer than 300 nm. For example, the first layer is set to the thickness of 75 nm, the second layer to 100 nm, the third layer to 125 nm and the fourth layer to 132 nm.

According to the display device of the present embodiment, a high contrast ratio is attained even when the display is viewed obliquely.

Aspect II

In the wrist watch of the structure shown in FIGS. 1 and 2, the shape of the transparent cover 5 serving as the sound source is not defined. When a conventional transparent cover of the watch is used without modification, the volume of sound is extremely reduced or harmonic sound is generated.

Accordingly, the present aspect intends to provide a transparent cover which produces sound within a desired frequency range, is mechanically strong and has a shape and dimension sufficient enough to provide a large volume of sound, and then, which is accompanied with a piezoelectric element as a sound generating vibrator.

Figure 6:
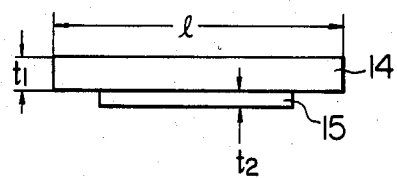
FIG. 6 is a front view showing a transparent cover and a piezoelectric element for illustrating the second aspect of the present invention.

FIG. 6 is a schematic view of a transparent cover 14 made of transparent glass and a transparent piezoelectric element 15 bonded to the transparent cover 14 by transparent adhesive material (not shown). The length of the transparent cover 14 is represented by l and the thickness thereof is represented by $t_1$, and the thickness of the piezoelectric element is represented by $t_2$. Desired dimensions l, $t_1$ and $t_2$ are determined in the following manner.

As a result of the analysing the factors to determin l, $t_1$ and $t_2$, that is, from the experiments to obtain the relationship between the dimension and the thickness of the transparent cover, and the frequency and volume of sound generated, the following relations were found.

(1) A resonance frequency (fr) may be as low as possible. It decreases in inverse proportion to a square of dimension (length) of the transparent cover.

(2) The resonance frequency increases in proportion to a sum of the thickness $t_1$ of the transparent cover and the thickness $t_2$ of the piezoelectric element.

(3) The volume of sound is proportional to $\{2t_2/(t_1+t_2)\}^2$.

(4) The mechanical strength is proportional to $(t_1+t_2)^3$ and inversely proportional to $l^2$. For men's watches having the dimension l of 30 mm, the thickness $t_1$ of the transparent cover glass must be 0.6 mm or thicker in order to assure the mechanical strength. Also the following requirements have been known in designing the wrist watch.

(5) As a thin piezoelectric element is hard to be handled it should be as thick as 0.1 mm or more.

(6) The sequential resonance frequencies are preferably below 4 kHz.

The present invention is based on the above requirements.

Figure 7:
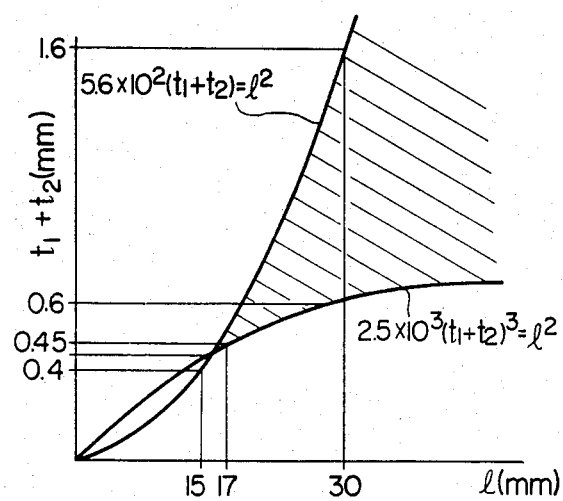
FIG. 7 is a graph showing a relationship between a sum of the thicknesses of the transparent cover and the piezoelectric element and the length of the transparent cover in accordance with the second aspect of the present invention.

After the above requirements were considered, l, $t_1$ and $t_2$ have been determined to fall within a hatched area on a graph shown in FIG. 7. The thickness $t_2$ must be 0.1 mm or more from the viewpoint of the machining process. When l, $t_1$ and $t_2$ meet the following experimental formulas, a desired result is obtained.

$$5.6 \times 10^2 (t_1+t_2) \leq l^2 \quad (1)$$

$$2.5 \times 10^3 (t_1+t_2)^3 \geq l^2 \quad (2)$$

$$t_2 \geq 0.1 \text{ mm} \quad (3)$$

A specific example of dimensions for a men's watch is given below. The length l of the men's watch is usually 30 mm. When the transparent cover is made of glass, the thickness $t_1$ must be 0.6 mm or more in order to assure the mechanical strength. The thickness $t_2$ of the piezoelectric element should be 0.1 mm or more from the machining requirement. The resonance frequency shall be 4 kHz. From the above requirements, for the men's wrist watch, $t_1$ is preferably 0.6–1.3 mm and $t_2$ is preferably 0.1–0.3 mm, and $t_1$ and $t_2$ may be determined to meet the condition of $t_1+t_2=0.7$–1.6 mm for the resonance frequency of 4 kHz.

Similarly, for a women's watch, when l=17, $t_1+t_2$ is 0.5 as shown in FIG. 7. Thus, if $t_1=0.1$, $t_2$ is 0.4.

For wrist watches, clocks, pocketable calculators and desk-top calculators, it may be conveniently determined that $t_1=\alpha l$ and $t_2=\beta l$, where $\alpha$ and $\beta$ are coefficients to be determined from the relationships between the above formulas. For example, $\alpha$ may be 0.01–0.07 and $\beta$ may be 0.003–0.01.

According to the present aspect, a transparent cover which generates a sufficient volume of sound at a desired frequency and has a sufficient mechanical strength can be provided.

Aspect III

In the wrist watch of the structure shown in FIGS. 1 and 2, the larger the relative dimension of the piezoelectric element 10 to the transparent cover 5 is, the higher is the vibration efficiency and the larger is the sound volume. However, the dimensions must be limited to the extent that room is left for bonding the electrical contact 11 to the surface of the transparent cover 5, and as the size of the piezoelectric element increases, the manufacturing cost of the piezoelectric element abruptly increases. Accordingly, from the cost viewpoint, the size is limited to the minimum. When the size of the piezoelectric element 10 is reduced relative to the transparent cover 5, the volume of sound gradually decreases, and when it is reduced to smaller than a display window (which is a view area to present a display panel for indicating time as compared with an area surrounding the view area and not presenting the display panel which is referred to as a shielding area), the peripheries of the piezoelectric element appear in the view area and the electrical contact of the piezoelectric element with the front electrode is also exposed. This presents a bad appearance.

Thus, a sufficient volume of sound will not be produced unless the bonding area of the vibration exciting piezoelectric element is defined in an appropriate area not only from the viewpoint of appearance and structure but also from the viewpoint of acoustic effect.

Accordingly, the present aspect is intended to provide a display device of a low manufacturing cost by reducing the size of the piezoelectric element relative to the transparent cover as much as possible while maintaining a desired volume of sound.

One embodiment of the present aspect is now explained with reference to the drawing.

Figure 8:
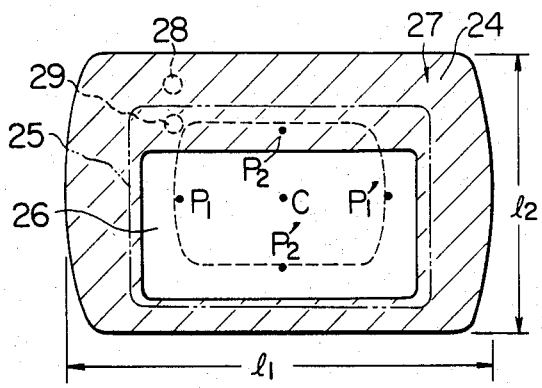
FIG. 8 is a plan view showing a portion of a wrist watch in accordance with the third aspect of the present invention.

FIG. 8 shows a plan view of a transparent cover in accordance with one embodiment of the present aspect. Shown therein are a transparent cover 24 made of generally rectangular transparent glass plate and a transparent piezoelectric element 25 bonded to an inner surface of the transparent cover 24. A rectangular view area 26 extends from the center to the bottom of the transparent cover 24 and the peripheral frame-shaped area forms a shielding area (hatched area in the drawing) 27. The view area 26 includes points $P_1$, $P_1'$ and $P_2'$ but not point $P_2$. The points $P_1$ and $P_1'$ represent the mid-points between the corner C of the transparent cover 24 and the peripheral points of the transparent cover 24 on a major axis (length $l_1$), and the points $P_2$ and $P_2'$ represent the mid-points between the center C of the transparent cover 24 and the peripheral points on a minor axis (length $l_2$). The piezoelectric element 25 is slightly larger than the entire view area 26 and it is generally rectangular and includes the mid-point $P_2$ which is not included in the view area 26. Broken line circles 28 and 29 indicate electric contacts to be contacted to transparent electrodes mounted on both surfaces of the piezoelectric element 25.

According to the present embodiment, the piezoelectric element 25 extends over the entire view area 26 and the periphery thereof does not appear in the view area 26. The electric contacts 28 and 29 are also arranged in the shielding area which is offset from the view area 26. Accordingly, good appearance is presented.

In the present embodiment, the piezoelectric element 25 is rectangular and includes the mid-points $P_1$, $P_1'$, $P_2$ and $P_2'$. As a result, a desired volume of sound can be generated. When the vibration of the transparent cover is used as the sound source, low frequency sound is generally hard to generate because of the small size of the vibrator. Thus, the excitation of low frequency sound or a fundamental mode should not be prevented. The transparent cover is generally circular, elliptic or rectangular (like in the present embodiment), and a loop of vibration of the fundamental mode is at the center C on the major axis ($l_1$), and loops for the primary harmonic are at the one-quarter points from the ends of the major axis ($l_1$), that is, the mid-points $P_1$ and $P_1'$. As to the minor axis ($l_2$) mode, the loops for the primary harmonic are at the one-quarter points from the end of the minor axis, that is, the mid-points $P_2$ and $P_2'$. A broken line which connects those four points and is analoguous to the external periphery of the transparent cover defines an area which is equal to one quarter of the total area of the transparent cover. Thus the energy when the inside of the broken line is excited by the piezoelectric element amounts to 75% of the energy when the entire area of the transparent cover is excited. This has been theoretically proved, and the excitation of at least 75% provides a sufficient volume of sound. In the present embodiment, a desired volume of sound is provided by exciting a center area which is wider than the area defined by the points $P_1$, $P_2$, $P_1'$ and $P_2'$ of the transparent cover 24.

The present aspect is not limited to the specific embodiment explained above. The piezoelectric element must cover the mid-points $P_1$, $P_1'$, $P_2$ and $P_2'$ which are loops of the primary harmonic and extend over the entire view area without exposing the periphery thereof to the view area. Since the smaller piezoelectric element costs less, the size of the piezoelectric element is preferably as small as possible so long as the above requirements are met. In other words, the periphery of the piezoelectric element is slightly off the view area and extends into the shielding area and the area of the piezoelectric element covers the loops of the primary harmonics (mid-points $P_1$, $P_1'$, $P_2$ and $P_2'$).

The application of the display device of the present aspect is not limited to the wrist watch, but it may be applicable to other microelectronic apparatus and devices such as small size clocks, pocketable calculators, or desk-top calculators, which have displays and transparent glass covers serving as the sound generators.

According to the present aspect, a low cost display device with sufficient volume of sound can be provided.

Aspect IV

Figure 9:
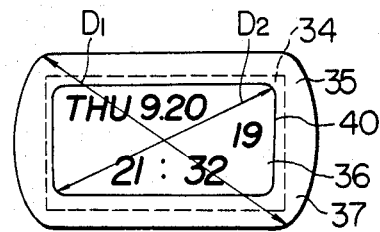
FIG. 9 is a plan view of a transparent cover for illustrating the fourth aspect of the present invention.

In the wrist watch of the structure shown in FIGS. 1 and 2, the transparent piezoelectric element 10 is used. Accordingly, the piezoelectric element 10 may be large provided that it does not prevent the display of time and does not strike the inner surface of the transparent cover 5. The larger the piezoelectric element is, the larger is the sound generated, but since the contact 11 has to be mounted on the bonding surface to the transparent cover, the size of the piezoelectric element must be limited to leave a room therefor. As shown in FIG. 9, the piezoelectric element 34 extends over the entire transparent view area 36 encircled by a curve 40 of the transparent cover 35. As explained in connection with the Aspect III, it is not desirable from the viewpoint of appearance that the periphery of the element extends off the shielding area 37 surrounding the view area 36 into the view area 36 so that the periphery is exposed in the view area.

On the other hand, since a boule of the piezoelectric element material (transparent piezoelectric ceramic) is synthesized by a hot press sintering process, the transparent ingot is usually cut to a disk-shape or a cylindrical shape. Accordingly, for the wrist watch having a rectangular display, the piezoelectric element is also rectangular and hence four edges must be cut away from a sliced disk material of the ingot. This is a wasteful process. Furthermore, when the rectangular element is used, it has sharp corners, which may be broken during the assembling process and may cause cracks.

On the other hand, since the mould die for manufacturing the ingot is expensive, it is desirable to prepare only one or two ingot shapes for larger size men's watches and smaller size women's watches, respectively, and cut out various shapes of elements to be bonded to the transparent cover of any wrist watch.

The inventors of the present invention studied the relationship between the outer diameters $D_1$ of the transparent covers of the commercially available wrist watches and the outer diameters $D_2$ of the view areas and found out that when the outer diameter $d_1$ of the piezoelectric element is selected to $0.7 \sim 0.9 D_1$ the periphery of the piezoelectric element does not extend into the view area.

Accordingly, the present aspect is intended to provide a sliced material which eliminates the waste of the piezoelectric material, requires a smaller number of machining steps and has a high utility for general purpose.

Figure 10:
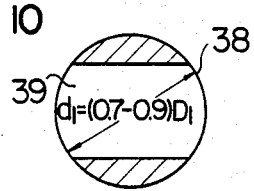
FIG. 10 is a plan view of a sliced element in accordance with one embodiment in the fourth aspect of the present invention.

FIG. 10 shows an embodiment of the present aspect. As shown, in order to cut out a piezoelectric element body 39 from a body 38, an ingot having a diameter ($d_1$) which is 0.7-0.9 times as large as the outer diameter $D_1$ of the transparent cover of the conventional wrist watch is prepared. To cut out the piezoelectric element body, two peripheral edges parallel to the major axis are cut away. (Hatched areas are cut-away areas.) The outer periphery of the ingot is left at the corner. In this manner, both ends of the piezoelectric element body 39 have an arcuate shape so that it is hard to be broken.

Figure 11:
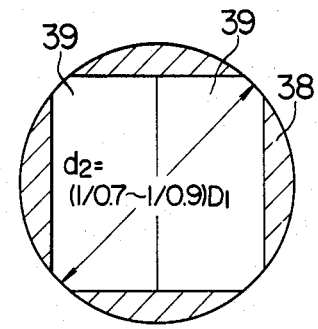
FIG. 11 is a plan view of a sliced element in accordance with another embodiment in the fourth aspect of the present invention.

FIG. 11 shows another embodiment of the present aspect. In the present embodiment, the relationship between the ingot diameter $d_2$ and the cover diameter $D_1$ which is most convenient to cut out two piezoelectric element bodies 39 was studied and it was found that the ingot diameter $d_2$ equal to $(1/0.7 - 1/0.9) D_1$ was most appropriate. In this embodiment, the ingot outer periphery is left at two corners of the piezoelectric element body 39 to make easy the attachment of the piezoelectric element to the transparent cover.

In those embodiments, only one type of ingot may be prepared to provide piezoelectric element bodies for various types of watches. Since certain corners of the piezoelectric element body utilize the grown surface of the ingot to the periphery of the cut disks, the ingot size can be significantly reduced and the manufacturing cost can also be reduced.

The present aspect is not limited to the specific embodiment explained above.

According to the present aspect;

(1) the ingot can be minimized to make the hot press process easier, (2) the waste of the piezoelectric material can be reduced, and (3) when the transparent cover to which the piezoelectric element is bonded is assembled into the case, the break of the corners of the element by striking the element against the case is avoided and hence the formation of cracks which may reach the display can be prevented.

Aspects I-IV are separately explained but it is easily understood by those skilled in the art that the combination thereof is contemplated.

In the wrist watch shown in FIGS. 1 and 2, the piezoelectric element of the cover may be bonded by (1) transparent adhesive material made of two types of epoxy resin with the bonded assembly being baked at an oven temperature of 125° C. for 60 minutes, or (2) instant adhesive material.

The epoxy resin adhesive material has the following disadvantages:

(1) Since the epoxy resin adhesive material has a high viscosity, air bubbles may easily be left. This presents a poor appearance.

(2) Since the baking is carried out at 125° C. while the piezoelectric element has a curie point Tc of 80°–90° C., electrical and physical properties of the piezoelectric element change so that the amplitude of the vibration of the sound generator decreases and hence the volume of sound decreases.

(3) Because of baking, strain may remain due to the differences in the thermal expansion coefficients of the cover, the piezoelectric element and the epoxy resin adhesive material and hence a sufficient amount of vibration is not excited.

(4) Because mixing double resin types of epoxy resin are used, a mixing operation is needed, which is troublesome. In addition, since the mixture starts to harden immediately, the handling time is restricted.

The instant adhesive material has the following disadvantages:

(1) The instant adhesive material is hard to be bonded when it is applied thick. When it is applied thin, air bubbles are likely to be produced. Since the contact areas are instantly bonded, air bubbles when included cannot be removed.

(2) When the piezoelectric element is to be bonded to the cover, no misoperation is allowed because the contact areas are bonded instantly. When an external force is applied during the bonding step, the respective parts are bonded in deformed condition so that strain remains and the vibration effect is deteriorated.

(3) The instant adhesive material has poor transparency and may interfere with the visibility of the display.

Accordingly, the present aspect is intended to provide a display device having a high vibration effect.

The present aspect is also intended to provide a display device which has a high transparency, is free from air bubbles and has a good appearance.

The present aspect is further intended to provide a display device which is easy to manufacture.

Figure 12A:
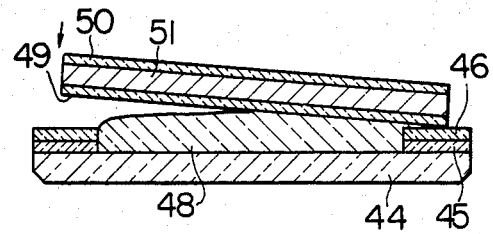
FIGS. 12a–12c are sectional views showing partial manufacturing steps of a wrist watch in accordance with one application of the present invention.
Figure 12B:
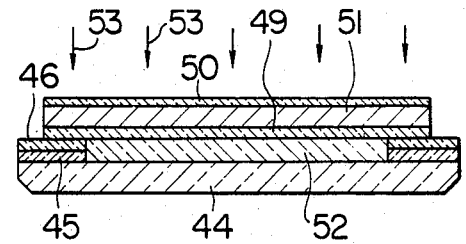
Figure 12C:
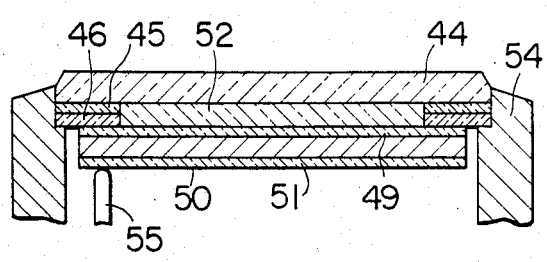

FIGS. 12a to 12c are sectional views showing partial manufacturing steps of the wrist watch in accordance with one embodiment of the present aspect. As shown in FIG. 12a, a transparent cover 44 which is to be arranged in front of a display panel, not shown, is prepared. In FIG. 12a, the transparent cover 44 is faced down. The transparent cover 44 is made of transparent glass, and a frame-shaped printed layer 45 and a conductive layer 46 are formed on the peripheral edges of the back side (inner surface) of the cover. Since display symbols are marked on the printed layer 45, it is referred to as a decorating printed layer. The inside surrounded by the printed layer 45 is a view area 47 on which numeral figures such as hour, minute and second, are displayed. The conductive layer 46 is made by printing conductive paste on the printed layer 45 and then baking it. Those layers are formed into the thickness of several tenths microns.

Then, ultra-violet ray setting adhesive material 48 is applied to the inner surface of the transparent cover 44 surrounded by the printed layer 45 and the conductive layer 46, to the thickness slightly higher than the level of the conductive layer 46. Such adhesive material is well known (e.g. adhesive material called by a tradename of UV 68) and it is set by ultraviolet rays. It has a low viscosity, e.g. 1,000 CPS which is lower than the viscosity of the epoxy resin adhesive material (e.g. 10,000 CPS). The change rate due to curing is lower than that of the epoxy resin adhesive material. The transparency is higher than that of the instant adhesive material.

Then, a transparent piezoelectric element 51 having transparent electrodes 49 and 50 coated on both surfaces thereof is layed on the adhesive material 48 and bonded thereby. As shown in FIG. 12a, the piezoelectric element 51 is bonded carefully from one side thereof so that no air bubbles remain in the adhesive material layer 52 as shown in FIG. 12b. The transparent electrode 49 at the junction of the piezoelectric element 51 contacts the conductive layer 46.

Then, as shown in FIG. 12b, ultraviolet rays (arrows) 53 are irradiated to the adhesive material 52 from the side of the piezoelectric element to set the adhesive material layer 52. The adhesive material layer 52 may also be set by irradiating the ultraviolet rays from the side of the transparent cover.

Figure 13:
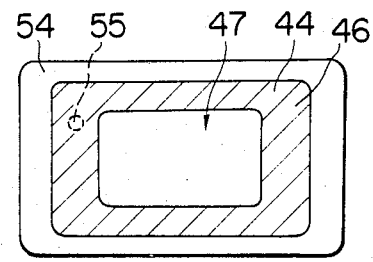
FIG. 13 is a fragmental plan view of the wrist watch in accordance with the application of the present invention.

Then, as shown in FIG. 12c, the transparent cover 44 having the piezoelectric element 51 attached thereto is fitted to the case 54 of the watch. Since the case 54 is made of conductive material, a grounding contact for the piezoelectric element 51 is not necessary if the case 54 is at a ground potential. One of the transparent electrodes 49 of the piezoelectric element 51 is electrically connected to the case 54 through the conductive layer 46. As shown in FIG. 12c, a single contact 55 which contacts the exposed transparent electrode 50 of the piezoelectric element 51 need be provided. As explained in the Aspects III and IV, if the contact is visible, it presents a poor appearance. Therefore, as shown in FIG. 13, it must be accommodated in the conductive layer area so that it does not extend to the view area 47

(the area inside the printed layer 45, shown by hatched area).

The watch thus constructed has the following advantages:

(1) Since the ultraviolet ray setting adhesive material has a low viscosity, air bubbles are easy to be removed. Unlike the instant adhesive material, air bubbles are not sealed in the bonding area. By bonding the piezoelectric element from one side thereof, wrapping-in of air can be prevented. In this manner, no air bubble is included and good appearance is presented.

(2) The ultraviolet ray setting adhesive material sets at a temperature lower than the Curie point (80°–90° C.) of the piezoelectric element. Accordingly, the electrical and physical properties of the piezoelectric element are not damaged.

(3) Unlike the epoxy resin adhesive material, the ultraviolet ray hardening adhesive material does not have to be heated to a high temperature and hence no internal thermal strain is produced. Since the ultraviolet ray hardening adhesive material has a small change rate, residual strain is hard to be produced. Since the ultraviolet ray hardening adhesive material is flexible and does not set instantly, improper registration during the pre-bonding stage can be corrected before the adhesive sets and no residual strain is produced. As a result, the vibration generated in the piezoelectric element is positively propagated to the transparent cover so that a large volume of sound is generated.

(4) The ultraviolet ray type adhesive material has a high transparency and hence it enables the display on the watch display panel to be readily visible.

(5) Since the ultraviolet ray hardening adhesive material is not a two-epoxy resin type adhesive material, mixing of epoxy resins needed for an epoxy resin adhesive material is not necessary. The epoxy resin adhesive material starts to set immediately after mixing and hence bonding must be carried out immediately and the working time period is restricted. In the present embodiment, the working time period is not restricted and high workability is attained. Furthermore, since the ultraviolet ray hardening adhesive material does not set instantly unlike the instant adhesive material, the work is ready, and the workability is enhanced.

The present aspect is not limited to the specific embodiment explained above. For example, in order to attain positive contact between one of the transparent electrodes of the piezoelectric element and the conductive layer of the transparent cover, a conductive projection may be provided on the conductive layer. The present aspect may be applicable to any display device other than watches.

The display device of the present aspect provides clear display, is free from undesired air bubbles and provides high quality of sound and large volume of sound.

The display device of the present aspect provides high workability when it is manufactured.

What is claimed is:

1. A display device having a transparent cover serving as a vibrator of a sound generator, said transparent cover having a transparent piezoelectric element coated with transparent electrodes on both surfaces thereof, bonded to an inner surface of said transparent cover by transparent adhesive material, said transparent cover being arranged in front of a display panel of said display device, wherein each of said transparent electrodes has a thickness in the range from 75 nm to 125 nm, which corresponds to one quarter of the wavelength of the near ultraviolet light from 300 nm to 500 nm so as to serve as an anti-reflection film for the near ultraviolet light.

2. A display device according to claim 1, wherein each of said transparent electrodes is a multi-layer film.

3. A display device according to claim 1, wherein an area of said transparent cover other than a specific view area is formed as a shielding area, said piezoelectric element extends to cover mid-points between the center of said transparent cover and edges of said transparent cover, and said piezoelectric element is dimensioned to a minimum size such that its periphery does not extend into said view area.

4. A display device according to claim 1, wherein each of said transparent electrodes is formed of $In_2O_3$—$SnO_2$.

5. A display device having a transparent cover serving as a vibrator of a sound generator, said transparent cover having a transparent piezoelectric element coated with transparent electrodes on both surfaces thereof, bonded to an inner surface of said transparent cover by transparent adhesive material, said transparent cover being arranged in front of a display panel of said display device, wherein a length $l$ and a thickness $t_1$ of said transparent cover and a thickness $t_2$ of said piezoelectric element are selected to meet the following relations:

$$5.6 \times 10^2 (t_1 + t_2) \leq l^2 \quad \text{(a)}$$

$$2.5 \times 10^3 (t_1 + t_2)^3 \geq l^2 \quad \text{(b)}$$

$$t_2 \geq 0.1 \text{ mm} \quad \text{(c)}.$$

6. A display device according to claim 5, wherein each of said transparent electrodes is formed of $In_2O_3$—$SnO_2$.

7. A display device having a transparent cover serving as a vibrator of a sound generator, said transparent cover having a transparent piezoelectric element coated with transparent electrodes on both surfaces thereof, bonded to an inner surface of said transparent cover by transparent adhesive material, said transparent cover being arranged in front of a display panel of said display device, wherein each of said transparent electrodes has a thickness in the range from 75 nm to 125 nm, which corresponds to one quarter of the wavelength of the near ultraviolet light from 300 nm to 500 nm so as to serve as an anti-reflection film for the near ultraviolet light, and wherein the length $l$ and the thickness $t_1$ of said transparent cover and the thickness $t_2$ of said piezoelectric element are selected to meet the following relations:

$$5.6 \times 10^2 (t_1 + t_2) \leq l_2 \quad \text{(a)}$$

$$2.5 \times 10^3 (t_1 + t_2) \leq l_2 \quad \text{(b)}$$

$$t_2 \geq 0.1 \text{ mm} \quad \text{(c)}.$$

8. A display device according to claim 7, wherein each of said transparent electrodes is formed of $In_2O_3$—$SnO_2$.

* * * * *